United States Patent
Li

(10) Patent No.: US 12,250,359 B2
(45) Date of Patent: Mar. 11, 2025

(54) MULTI-TRACK BASED IMMERSIVE MEDIA PLAYOUT

(71) Applicant: ZTE Corporation, Guangdong (CN)

(72) Inventor: Qiuting Li, Guangdong (CN)

(73) Assignee: ZTE Corporation, Guangdong (CN)

( * ) Notice: Subject to any disclaimer, the term of this patent is extended or adjusted under 35 U.S.C. 154(b) by 37 days.

(21) Appl. No.: 17/816,093

(22) Filed: Jul. 29, 2022

(65) Prior Publication Data

US 2022/0368876 A1 Nov. 17, 2022

Related U.S. Application Data

(63) Continuation of application No. PCT/CN2021/072214, filed on Jan. 15, 2021.

(51) Int. Cl.
*H04N 13/111* (2018.01)
*H04N 13/161* (2018.01)
*H04N 13/178* (2018.01)
*H04N 13/194* (2018.01)

(52) U.S. Cl.
CPC ......... *H04N 13/111* (2018.05); *H04N 13/161* (2018.05); *H04N 13/194* (2018.05); *H04N 13/178* (2018.05)

(58) Field of Classification Search
None
See application file for complete search history.

(56) References Cited

U.S. PATENT DOCUMENTS

| | | |
|---|---|---|
| 2016/0234570 A1 | 8/2016 | Van Deventer et al. |
| 2019/0318488 A1 | 10/2019 | Lim et al. |
| 2020/0304834 A1 * | 9/2020 | Wang .................. H04N 19/597 |
| 2021/0005016 A1 | 1/2021 | Oh |
| 2021/0195162 A1 | 6/2021 | Chupeau et al. |
| 2021/0409767 A1 * | 12/2021 | Oh ..................... H04N 21/8456 |

(Continued)

FOREIGN PATENT DOCUMENTS

| | | |
|---|---|---|
| CN | 111434121 A | 7/2020 |
| WO | 2020/132631 A1 | 6/2020 |
| WO | 2021/003371 A1 | 1/2021 |

OTHER PUBLICATIONS

International Search Report and Written Opinion International Application No. PCT/CN2021/072214, mailed on Oct. 18, 2021 (9 pages).

(Continued)

*Primary Examiner* — Christopher Braniff
(74) *Attorney, Agent, or Firm* — Perkins Coie LLP

(57) ABSTRACT

Methods, apparatus, and systems for dynamically indicating a playout group in various scenarios are disclosed. In one example aspect, a method includes determining a playout group corresponding to a volumetric video in a three-dimensional space based on a playout group information, the playout group including a plurality of components, wherein each component of a certain type has a version that is different from another component of the certain type, obtaining a two-dimensional volumetric video content from a media track corresponding to the playout group, and reconstructing the volumetric video into a three-dimensional space based on the plurality of components with different versions.

20 Claims, 7 Drawing Sheets

(56) References Cited

U.S. PATENT DOCUMENTS

2022/0329923 A1* 10/2022 Hamza ................ H04N 21/816

OTHER PUBLICATIONS

Extended European Search Report for co-pending EP Application No. 21918574.1, mailed on Jan. 24, 2024 (12 pages).
Anonymous: Potential improvement for ISO/IEC 23090-10 Carriage of Visual Volumetric Video-based Coding Data, MPEG Meeting; Oct. 12, 2020-Oct. 16, 2020, Nov. 20, 2020, 73 pages.
Qiuting, et al. "On track alternatives and playout group of V3C" MPEG Meeting; Oct. 11, 2021-Oct. 15, 2021; Jan. 6, 2021, 4 pages.
"Technologies under consideration on carriage of V3C data", 131. MPEG Meeting; Jun. 29, 2020-Jul. 3, 2020, No. N19425 Jul. 28, 2020, 117 pages.
Office Action for co-pending JP Application No. 2023-542697, mailed on Sep. 3, 2024 (8 pages with machine translation).
ISO /IEC "Coded representation of immersive media—Part 10: Carriage of visual volumetric video-based coding data", Standard ISO/IEC Dis 23090-10, ISO, Oct. 5, 2020, 15 pages.
Office Action for co-pending KR Application No. 10-2023-7024250, mailed on Jun. 3, 2024 (10 pages with machine translation).
Notice of Allowance for co-pending KR Application No. 10-2023-7024250, mailed on Aug. 22, 2024 (12 pages with machine translation).

* cited by examiner

600

---

Determine a playout group corresponding to a volumetric video in a three-dimensional space based on a playout group information, the playout group including a plurality of components, wherein each component of a certain type has a version that is different from another component of the certain type     610

Obtain a two-dimensional volumetric video content from a media track corresponding to the playout group     620

Reconstruct the volumetric video into a three-dimensional space based on the plurality of components with different versions     630

FIG. 6

MULTI-TRACK BASED IMMERSIVE MEDIA PLAYOUT

CROSS-REFERENCE TO RELATED APPLICATION

This patent document is a continuation of and claims benefit of priority to International Application No. PCT/CN2021/072214, filed on Jan. 15, 2021. The entire content of the before-mentioned patent application is incorporated by reference as part of the disclosure of this application.

TECHNICAL FIELD

This patent document relates generally to immersive technologies.

BACKGROUND

With the recent development of human-computer interaction and artificial intelligence technologies, immersive technology is revolutionizing the way we work and live. Immersive technology is applied in several areas, including marketing and advertising, healthcare, education, and gaming. The rapid development of new immersive technologies requires effectively processing video and image data.

SUMMARY

This patent document describes, among other things, techniques for dynamically indicating a playout group in various scenarios.

In one aspect, a method of processing media content is disclosed. The method includes determining a playout group corresponding to a volumetric video in a three-dimensional space based on a playout group information, the playout group including a plurality of components, wherein each component of a certain type has a version that is different from another component of the certain type, obtaining a two-dimensional volumetric video content from a media track corresponding to the playout group, and reconstructing the volumetric video into a three-dimensional space based on the plurality of components with different versions.

In another aspect, a method of processing media content is disclosed. The method includes configuring, by a server, a playout group including one or more types of components, each component of a type having a different version from another component of the type, configuring, by the server, a playout group information corresponding to the playout group, and transmitting, by the server, to a use device, the playout group information in a media presentation description.

In another example aspect, a wireless communication apparatus comprising a processor configured to implement an above-described method is disclosed.

In another example aspect, a computer storage medium having code for implementing an above-described method stored thereon is disclosed.

These, and other, aspects are described in the present document.

BRIEF DESCRIPTION OF THE DRAWINGS

FIG. 6 shows an example of a method of processing media content based on some example embodiments of the disclosed technology.

DETAILED DESCRIPTION

Figure 1:
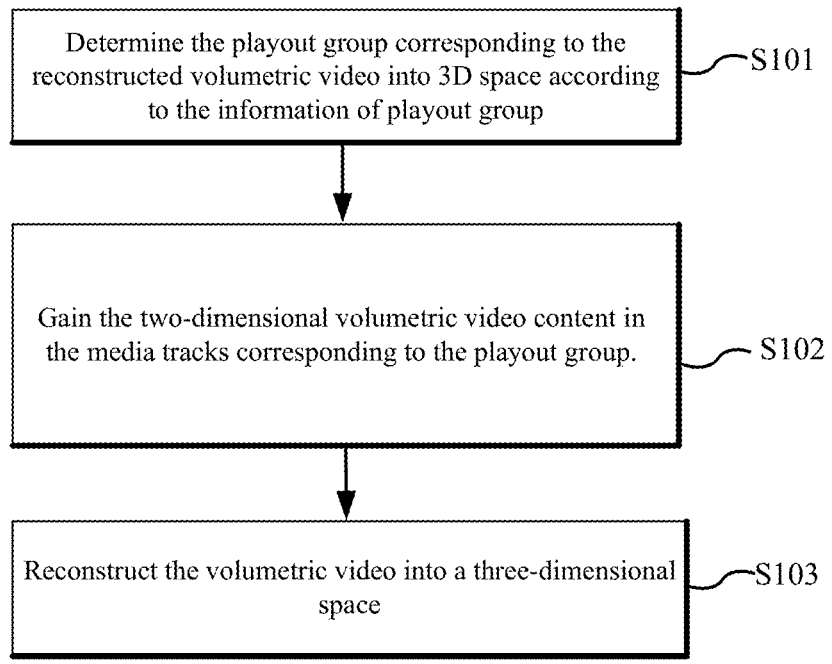
FIG. 1 is a flowchart showing an example of volumetric video data processing based on a playout group.

Section headings are used in the present document only for ease of understanding and do not limit scope of the embodiments to the section in which they are described.

The disclosed technology can be implemented in some embodiments to provide playout representations and processing methods based on multi-track encapsulated volumetric videos, which can improve transmission efficiency and rendering processing. Some embodiments of the disclosed technology can be used to effectively transmit the volumetric video content under different network conditions and reconstruct volumetric video with appropriate quality.

Immersive media allows users to experience a highly immersive feeling in a realistic virtual space through audio and video technologies. At present, immersive media systems use volumetric video to represent a three-dimensional scene/object, that is, any object in the scene can be viewed through the movement of six degrees of freedom.

In the immersive media system, for the volumetric video processing process, the system platform produces volumetric videos, including projecting the three-dimensional volumetric video onto a two-dimensional plane, representing volumetric video by atlas data (projection relationship between the three-dimensional space and the two-dimensional space) and two-dimensional components (geometric, attribute, and occupancy map data), compressing the atlas data and component data, encapsulating into media file. The volumetric video is stored in platform side, and is transferred to user side based on viewing requirement.

Under the current technology, according to the representation of volumetric video on a two-dimensional plane, a volumetric video media file can include multiple tracks where each track contains volumetric video parameters, atlas parameters, atlas data, and/or V3C components separately. V3C (Visual Volumetric Video-based Coding) components data are compressed using video encoding methods, which can be generated in different versions, such as AVC (Advanced Video Coding), HEVC (High Efficiency Video Coding) encoding methods, different bit rates, resolutions, etc.

The different versions of occupancy, geometry and attributes components may have relationship or dependency between each other. A geometry component data is generated based on the atlas data and the occupancy component. Moreover, an attribute component data is also generated based on the occupancy component data, geometry component data and other information. When the dependencies are not preserved, visible rendering artefacts can occur. For example, boundaries that are not matching exactly between geometry and attribute(s) may cause "flying pixels". Even more visible errors can occur when the correct occupancy track is not pair with the matching geometry track. A combination of different quality occupancy map and geometry may easily end up generating warped edges around patch boundaries. In this case, only certain combinations of V3C components from alternative groups can be played out together.

According to the dependencies between different versions and types of V3C components, there are many playout combinations form the alternative groups or alternate groups which include same type V3C components with different versions. The current specification defines a mechanism to indicate alternative playout groups by track group or entity group. The combination of each playout group is constant in the playout process, it is necessary to list all the playout combinations as much as possible so that the optimal playout scheme can be selected by the user terminal. If there are multiple atlases or atlas tiles, the number of such groups will be large.

For the volumetric video supporting six degrees of freedom, the director may consider to control and change the user's viewing state to guide the user to watch the best visual content during volumetric video production. The volumetric video content can be partial transmission, for example, high-quality version of component data corresponding to the field of view (FOV) and low-quality version of the component data outside FOV is transmitted, or the content within viewport is transmitted. Since the scenes/objects in the volumetric video are dynamically changed, the playout group should change accordingly. A mechanism for dynamically indicating the playout group is needed to adapt to more scenarios.

It should be noted that, in some embodiment of the disclosed technology, an implementation manner is to store the volumetric video data in a file based on the ISO (International Organization for Standardization, International Organization for Standardization) basic media file format. Among them, the ISO basic media file formats such as the restricted scheme information box, track reference box, and track group box can refer to the MPEG-4 formulated by the ISO/IEC JTC1/SC29 Moving Picture Experts Group (MPEG for short) Part 12 ISO Base Media File Format (ISO/IEC 14496-12) to operate. The projection, packaging steps and basic format of volume video can be operated with reference to MPEG-I Part 10 (ISO/IEC 23090-10) formulated by ISO/IEC JTC1/SC29 Moving Picture Experts Group (MPEG). The transmission of encapsulated volume video and its basic format can refer to the MPEG-DASH formulated by ISO/IEC JTC1/SC29/Moving Picture Experts Group (MPEG).

FIG. 1 is a flowchart showing an example of volumetric video data processing based on a playout group.

Some embodiments of the disclosed technology can be used to provide a playout method for multi-track based volumetric video. As shown in FIG. 1, a volumetric video processing based on playout group may include the following operations:

S201, determine the playout group corresponding to the reconstructed volumetric video into 3D space according to the information of playout group;

S202, gain the two-dimensional volumetric video content in the media tracks corresponding to the playout group; and S203, reconstruct the volumetric video into a three-dimensional space.

Figure 2:
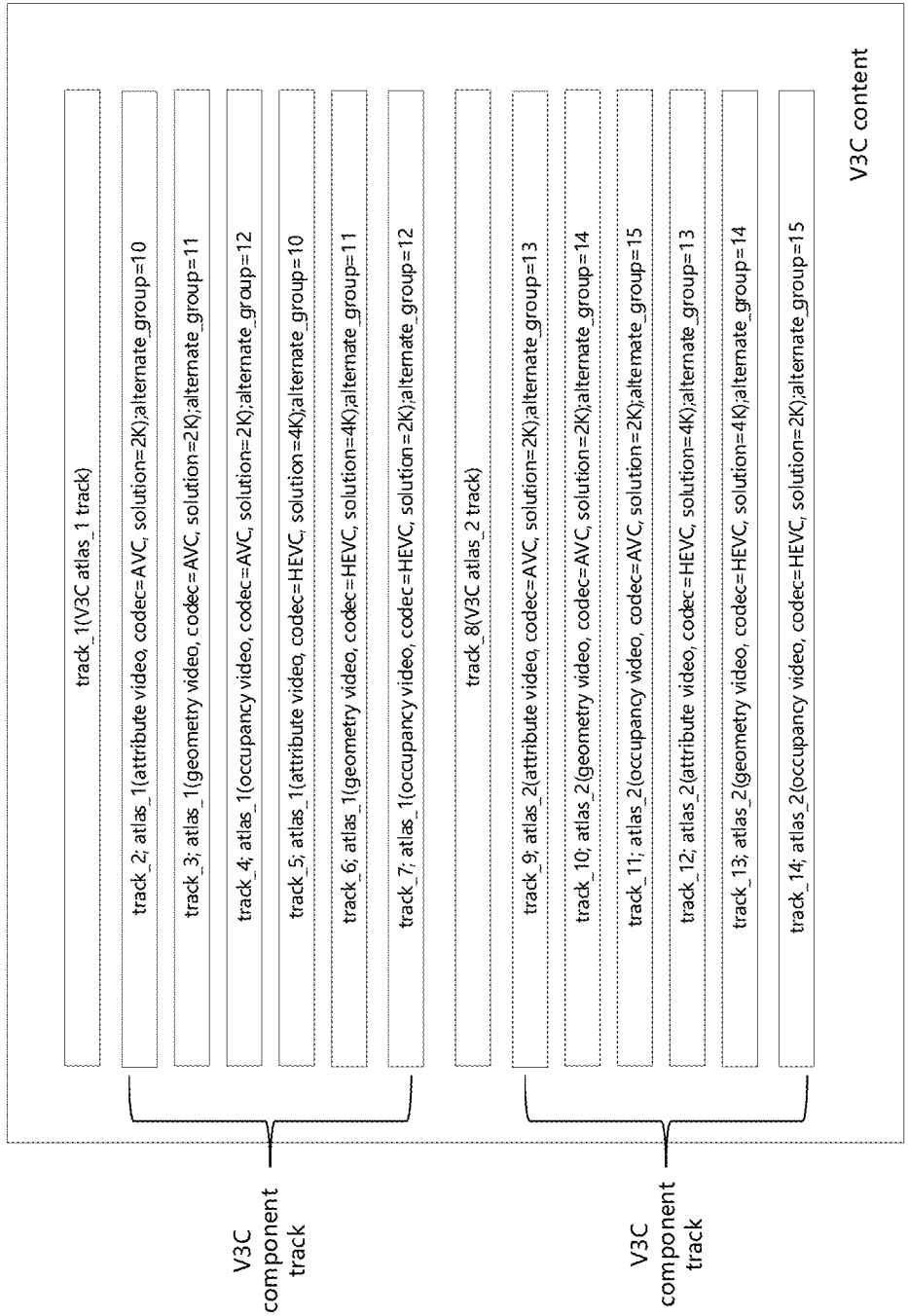
FIG. 2 is a diagram showing an example of a media track structure of alternative V3C components based on some embodiments of the disclosed technology.

FIG. 2 is a diagram showing an example of a media track structure of alternative V3C components based on some embodiments of the disclosed technology.

The media tracks store the volumetric video data projected from the three-dimensional space to the two-dimensional plane, including atlas data, and its corresponding geometry component, attribute component, and/or occupancy component, where each component may have alternative versions. The V3C components with different versions are stored in different tracks, the media tracks structure in media file as shown in FIG. 2.

If there are alternative schemes for the V3C component track, the V3C component track where the alternative component is located can form an alternative group, that is, playout group. There are multiple playout groups which can be selected during transmission, decoding, and/or reconstruction.

In an implementation, the media tracks where same type V3C component with different versions corresponding to the same atlas or atlas tile are located are alternative tracks which are indicated through the mechanism defined in ISO/IEC 14496-12. There is an alternate_group field in the TrackHeaderBox of alternative track. If V3C component tracks with the same alternate_group value contain V3C component of alternative versions, they are alternative track group.

In another implementation, the alternative track group also can be described by EntityToGroupBox with type of 'altr' defined by ISO/IEC 14496-12. The media tracks where the alternative V3C components are located forms an entity group. There may be multiple such groups, and each entity group has a group_id.

Figure 3:
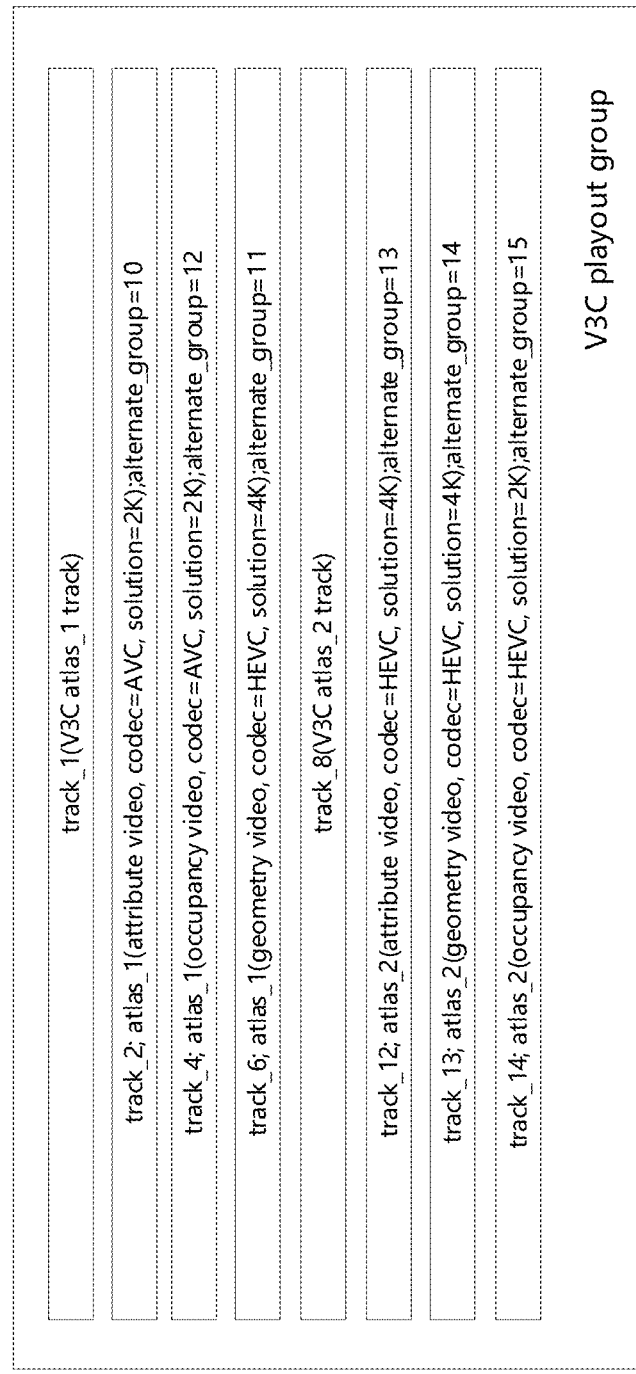
FIG. 3 is a diagram showing an example structure of a playout group of V3C component tracks based on some embodiments of the disclosed technology.

FIG. 3 is a diagram showing an example structure of a playout group of V3C component tracks based on some embodiments of the disclosed technology.

In some implementations, a playout group includes V3C components from multiple alternative track group, where the content of each V3C component in the play group is different, that is, two different versions of the same type V3C components corresponding to same atlas or atlas tile cannot be in a same playout group. An example of a playout group structure is shown in FIG. 3.

To ensure the quality of the three-dimensional volumetric video generated by reconstruction and rendering, different types and versions of V3C components corresponding to the atlas or atlas tile are not arbitrarily selected to a playout group. The user's viewing state and director's arrangement should be considered.

The playout group contains part of alternative V3C components corresponding to part of the atlases or atlas tiles corresponding to volumetric video in a partial three-dimensional space region. That is, V3C components corresponding to some atlases or atlas tiles may not be contained in the playout group at this moment.

The structure of a playout group is described by PlayoutGroupStruct which includes identifier of the playout group, the number of V3C components, V3C component type (such as geometry component, attribute component or occupancy component), and the identifier of the corresponding V3C component track.

```
PlayoutGroupStruct( ) {
    unsigned int(8) group_id;
```

-continued

```
        unsigned int(8) num_playout_member;
        for(int i=0; j< num_playout_member; i++){
            unsigned int(8) atlas_id;
            unsigned int(1) atlas_tile_flag;
            if(atlas_tile_flag) {
                unsigned int(8) num_tile;
                for(int j=0; j< num_tile; j++)
                    unsigned int(8) tile_id;
            }
            unsigned int(8) component_track_id;
            unsigned int(8) V3C_component_type;
        }
    }
```

Here, "group_id" indicates the identifier of the playout group, "num_playout member" indicates the number of V3C components in the playout group; "atlas_id" indicates the ID of the atlas corresponding to V3C component, "atlas_tile_flag" indicates whether the component track contains atlas tiles, if the value is 0, indicates that the component track don't contains atlas tiles, if the value is 1 indicates that the component track contains one or more atlas tile(s), "tile_id" indicates the ID of the atlas tile, "component_track_id" indicates the identifier of the V3C component track, and "V3C_component_type" indicates V3C component type stored in the V3C component track.

Solution 1

In some embodiments, the playout group corresponding to the user's viewport may have different frequency changes due to various factors, such as scene changes, director's intentions, etc. V3C components which need to be transmitted may correspond to all of the entire three-dimensional space region or part of the three-dimensional space region, so the playout group can be dynamically changed according to the actual viewing scene.

This solution provides a method to describe that playout group changes frequently and dynamically in media file.

The configuration information of playout group is described by DynamicPlayoutGroupConfigBox which is identified by the box type of 'dpog'.

```
                Box Type: 'dpog'
    Container:      Sample Description Box ('stsd')
    Mandatory:      No
    Quantity:       0 or 1
                    aligned(8) class DynamicPlayoutGroupConfigBox
                    extends FullBox('dpog', 0, 0) {
    unsigned int(8) num_playout_group;
    for(int i=0; i< num_playout_group; i++){
        unsigned int(1) viewport_match_flag;
        if(viewport_match_flag)
            unsigned int(8) viewport_id[i];
        PlayoutGroupStruct( );
        string playout group _description[i];
        unsigned int(8) effect_level[i];
    }
}
```

Here, "num_playout_group" indicates the number of playout groups, "viewport_match_flag" indicates whether the playout group corresponds to the viewport, "viewport_id" indicates the ID of the viewport which the playout group corresponding to, "effect_level" indicates the quality level of V3C component in the playout group. In addition, playout_group_description is null-terminated UTF-8 string that provides a textual description of playout group.

The volumetric video media file contains a timed-metadata media track which is identified by the sample entry with type of 'plgs'. The sample entry contains a data box of type 'dpog', which describes the configuration information of the dynamic playout group.

Syntax Example for the V3C Playout Group timed-metadata media track sample entry is:

```
        aligned(8) class PlayoutGroupSampleEntry( )
            extends MetadataSampleEntry ('plgs') {
            DynamicPlayoutGroupBox;
        }
```

Syntax sample format of the V3C Playout Group dynamic timed metadata track is:

```
        aligned(8) class DynamicPlayoutSample( ) {
    for(int i=0; i< num_playout_group; i++){
    if(viewport_match_flag){
        unsigned int(1) viewport_pos_update;
        unsigned int(8) viewport_index[i];
        if(viewport_pos_update)
            PlayoutGroupStruct( );
    }
    else
        PlayoutGroupStruct( );
        unsigned int(8) effect_level[i]
        unsigned int(8) num_addition_playout;
        for(int j=0; j< num_addition_playout; j++){
        PlayoutGroupStruct( );
        unsigned int(8) effect_level[num_playout_group+1+j];
    }
}
```

Here, "viewport_pos_update" indicates whether the viewport which the playout group corresponding to is changed, "num_addition_playout" indicates the number of newly added playout groups, and "viewport_index" indicates index of the viewport.

Furthermore, the timed metadata track is a mechanism in the ISO basic media file format (ISOBMFF) to establish timed metadata associated with a specific sample. Timing metadata is less coupled with media data and is usually "descriptive".

Solution 2

In some embodiments, the content of volumetric video is dynamic, but such changes are not very frequent. One or more playout groups may be used during a certain sampling period, and changed in the next time period. This solution provides a method to describe one or more playout groups is changed occasionally.

The samples in the media track where the atlas data and/or V3C parameter sets is located is grouped through the sample group method. The playout group information corresponding to the V3C component tracks referenced by the atlas track is described in sample group box of the media track.

The information of sample group based on playout group is described through PlayoutSampleGroupDescriptionEntry, which is contained in the SampleGroupDescriptionBox defined in ISO/IEC 14496-12 and ISO/IEC 23090-10.

```
        aligned(8) class PlayoutSampleGroupDescriptionEntry( ) extends
VolumetricVisualSampleGroupEntry('posg') {
    unsigned int(8) num_playout_group;
for(int i=0; i< num_playout_group; i++){
```

-continued

```
PlayoutGroupStruct( );
    unsigned int(8)effect_level[i];
  }
}
```

Solution 3

Figure 4:
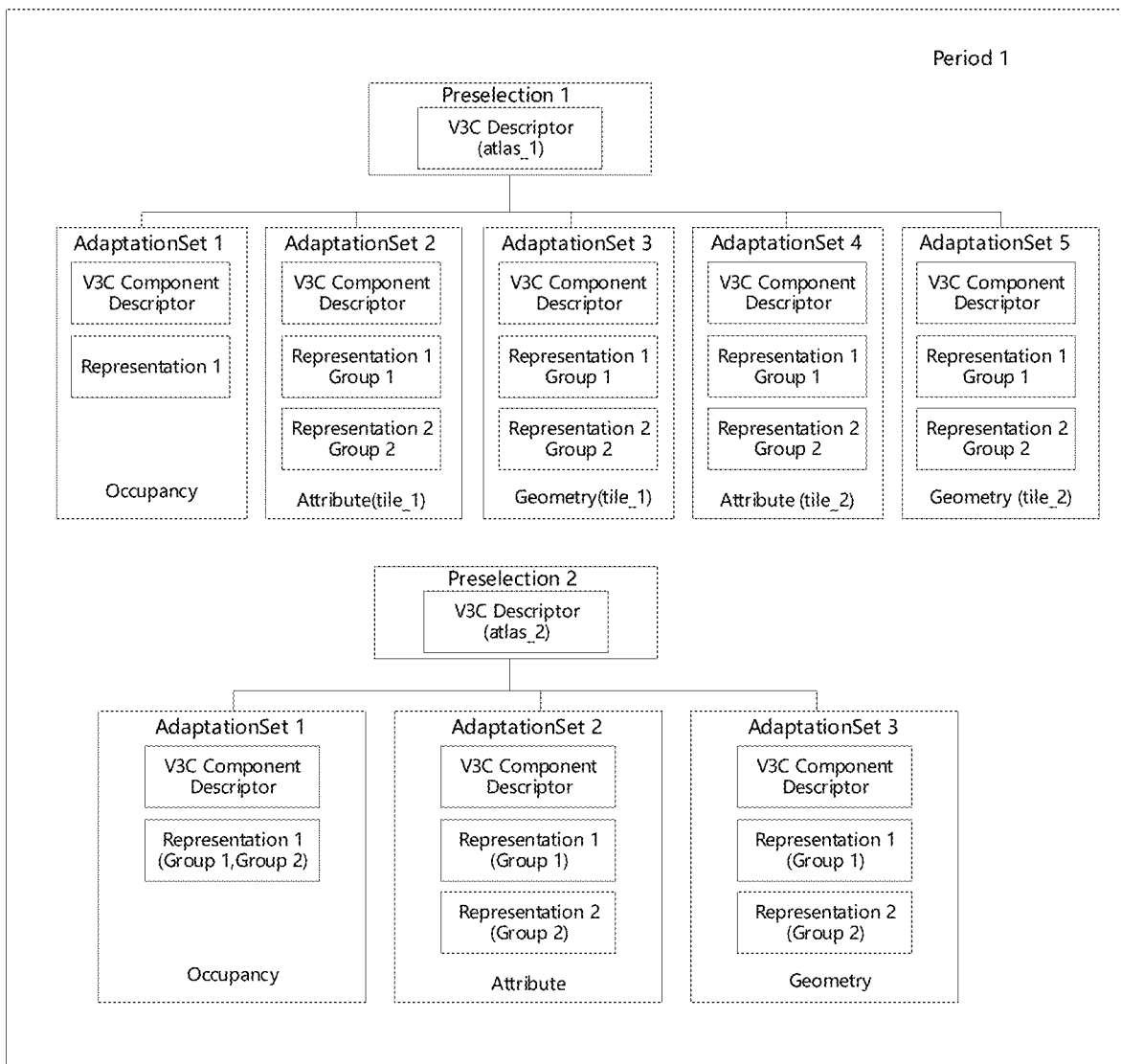
FIG. 4 is a diagram showing an example of a playout group structure of V3C components in a media presentation description (MPD) based on some embodiments of the disclosed technology.

FIG. 4 is a diagram showing an example of a playout group information of V3C components in a media presentation description (MPD) based on some embodiments of the disclosed technology.

In some embodiments, the V3C components in a certain playout group are transmitted to the user side according to the playout group information, and the terminal only needs to process the V3C components in the playout group. The information of transmitted media file stored in the server is described in the DASH (Dynamic Adaptive Streaming over HTTP) manifest (MPD), the user side can obtain the corresponding V3C component data from the server by referring to the information.

Each V3C component is represented as a separate adaptation set in the MPD. The adaptation sets of the atlas information are used as the main adaptation sets. If the geometry or attribute component has multiple maps corresponding to atlas tiles, a separate AdaptationSet element or presentationSet element is used to signal each V3C component.

In some implementations, playout_group_ids or/and alternative_group_id can be added to the AdaptationSet or presentationSet level for expressing the playout group information in MPD.

Here "playout_group_ids" indicates the identifiers of all playout groups that a V3C component in the presentation set or alternative V3C components in the adaptation set belongs to. The V3C component can belong to one or more playout groups at the same time, and "alternative_group_id" indicates the identifier of the alternative group to which the V3C component in the adaptation set belongs to.

In an implementation, V3CComponent descriptor is defined in ISO/IEC 23090-10 for each V3C component present in AdaptationSet, and playout_group_ids or/and alternative_group_id can be added to V3CComponent descriptor.

In another implementation, a PlayoutGroup descriptor is defined as SupplementalProperty element to describe playout group information in the MPD. The PlayoutGroup descriptor indicates the corresponding V3C component in the Representation set belongs to one or more playout groups.

There are one or more PlayoutGroup descriptors in the Representation set level of MPD. The PlayoutGroup descriptor may be in the MPD or AdaptationSet level. If the PlayoutGroup descriptor appears in the MPD or AdaptationSet level, the descriptor in the higher level should be used.

In some implementations, the PlayoutGroup descriptor which appears in the MPD or AdaptationSet level contains the elements and attributes defined in the following table.

TABLE 1

| elements and attributes | usage | description |
| --- | --- | --- |
| plog_1 | 0..N | Contain information of a playout group |
| plog_1@group_ids | CM | Specify the ID of a playout group |
| plog_1@componet_ids | CM | Specify the identifiers of the representation where the V3Ccomponent in the playout group is located |
| plog_1@playout_level | O | Specify the quality level of V3C component in the playout group |

In some other implementations, the PlayoutGroup descriptor which appears in RepresentationSet level contains the elements and attributes defined in the following table.

TABLE 2

| elements and attributes | usage | description |
| --- | --- | --- |
| plog_2 | 0..1 | Contain information of playout group corresponding to the V3C component in the Respresentation Set. |
| plog_2@group_ids | CM | Specify the list of IDs of playout groups which the V3C component belongs to |
| plog_2@playout_levels | O | Specify the list of the quality level of the V3C component corresponding to each playout group |

Figure 5:
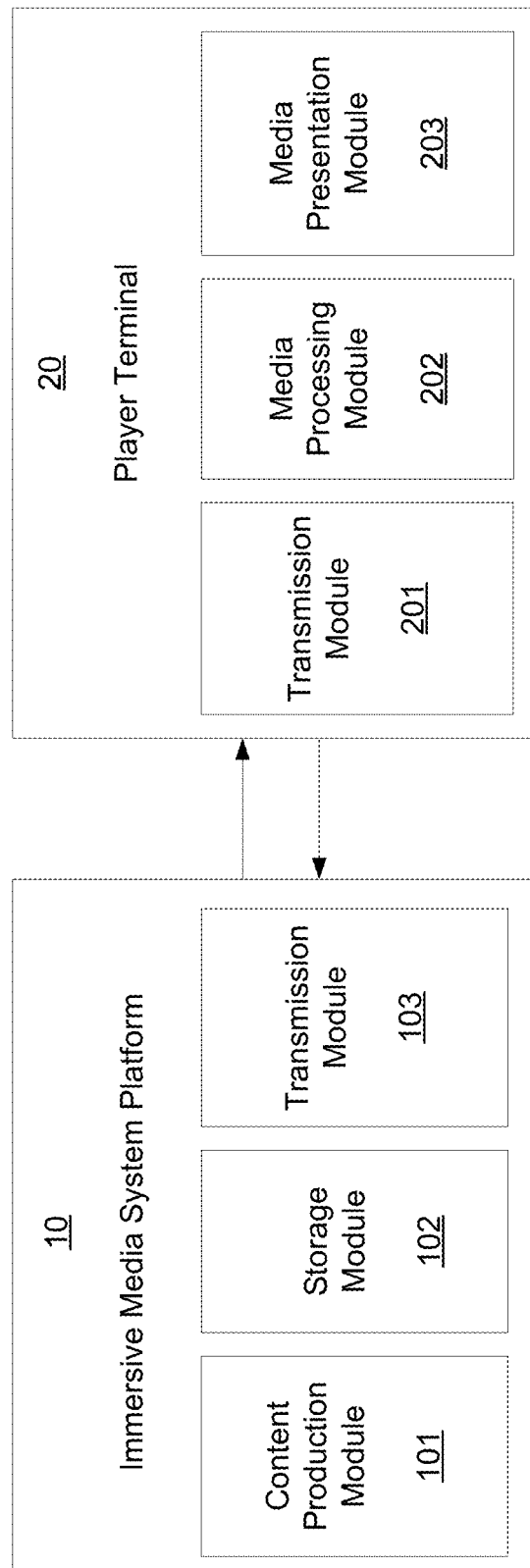
FIG. 5 is an example block diagram of a volumetric video data representation and processing device based on some embodiments of the disclosed technology.

FIG. 5 is an example block diagram of a volumetric video data representation and processing device based on some embodiments of the disclosed technology.

In some embodiments of the disclosed technology, an immersive media system includes an immersive media system platform 10 and a player terminal 20.

In some implementations, the immersive media system platform 10 includes a content production module 101, a storage module 102, and a transmission module 103. The content production module 101 may be is used for encoding and encapsulation processing of the captured volumetric video. The storage module 102 is used to store encapsulated media files and describe it by MPD. In addition, the transmission module 103 is used to receive request message from client terminal or send data (such as media file, MPD) stored in 102. The above mentioned receiving or sending can be realized through a wireless network provided by a communication provider, a local wireless area network, or a wired method. The display 20 includes at least a transmission module 201, a media processing module 202, and a media presentation module 203. The transmission module 201 is used to receive data (such as media files) sent by the transmission module 103 or send message to 103, such as request for a media file, report of user's state. The media processing module 202 is used to decode and decapsulate the received media file and reconstruct the volumetric video according to the user's current viewing state (such as viewing position, viewing direction, etc.) and perform rendering processing. In addition, the media presentation module 203 is used to present the reconstructed volumetric video in the user's viewport.

FIG. 6 shows an example of a method 600 of processing media content based on some example embodiments of the disclosed technology. At 610, the method includes determining a playout group corresponding to a volumetric video in a three-dimensional space based on a playout group information, the playout group including a plurality of components, wherein each component of a certain type has a version that is different from another component of the certain type. At 620, the method includes obtaining a two-dimensional volumetric video content from a media track corresponding to the playout group. At 630, the method includes reconstructing the volumetric video into a three-dimensional space based on the plurality of components with different versions.

Figure 7:
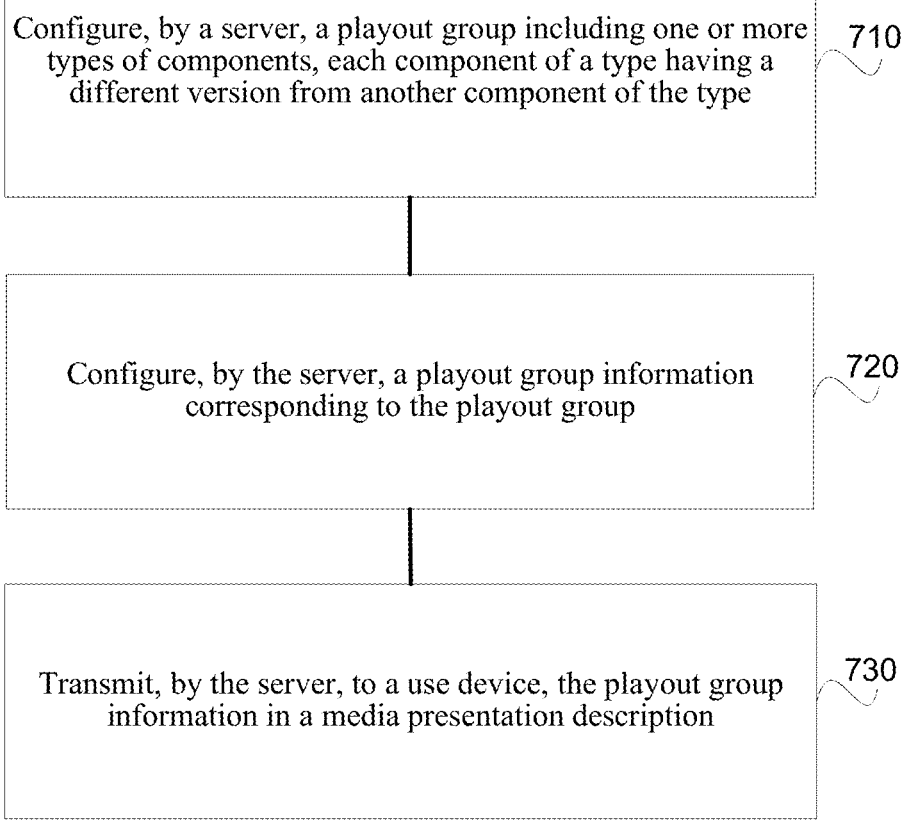
FIG. 7 shows another example of a method of processing media content based on some example embodiments of the disclosed technology.

FIG. 7 shows another example 700 of a method of processing media content based on some example embodiments of the disclosed technology. At 710, the method includes configuring, by a server, a playout group including one or more types of components, each component of a type having a different version from another component of the type. At 720, the method includes configuring, by the server, a playout group information corresponding to the playout group. At 730, the method includes transmitting, by the server, to a use device, the playout group information in a media presentation description.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document.

Clause 1. A method of processing media content, comprising: determining a playout group corresponding to a volumetric video in a three-dimensional space based on a playout group information, the playout group including a plurality of components, wherein each component of a certain type has a version that is different from another component of the certain type; obtaining a two-dimensional volumetric video content from a media track corresponding to the playout group; and reconstructing the volumetric video into a three-dimensional space based on the plurality of components with different versions.

Clause 2. The method of clause 1, wherein the components include visual volumetric video-based coding (V3C) components.

Clause 3. The method of clause 2, wherein the V3C components includes at least one of occupancy components, geometry components, or attribute components.

Clause 4. The method of clause 3, wherein each atlas or atlas tile corresponds to an attribute component, an occupancy component, and/or a geometry component with multiple versions.

Clause 5. The method of clause 3, wherein different versions of the occupancy components, different versions of the geometry components, and different versions of the attribute components, respectively, have dependency between each other.

Clause 6. The method of clause 1, wherein the playout group includes V3C components from multiple alternative track groups.

Clause 7. The method of clause 1, wherein the different versions include at least one of different encoding methods, different bit rates, or different resolutions.

Clause 8. The method of clause 1, wherein the components in the playout group correspond to one or more atlases or atlas tiles.

Clause 9. The method of clause 1, wherein the playout group is configured based on a timed-metadata track for configuring dynamic playout grouping information in a sample entry and/or one or more samples belonging to the sample entry.

Clause 10. The method of clause 9, wherein the timed-metadata track is used to configure the playout group at each sample time.

Clause 11. The method of clause 9, wherein the sample entry includes configuration information for configuring an initial playout group.

Clause 12. The method of clause 11, further comprising generating a flag to indicate changes in the playout group.

Clause 13. The method of clause 11, further comprising generating a flag to indicate one or more new playout groups.

Clause 14. The method of clause 1, wherein the playout group is configured based on a sample group including samples in a track contained video-encoded component data or a track contained atlas or atlas tile.

Clause 15. The method of clause 14, wherein the sample group is configured to be used during a sampling period and updated based on the sampling period.

Clause 16. The method of any of clauses 1-15, wherein the information of a playout group is described by syntax of structure of playout group.

Clause 17. A method of processing media content, comprising: configuring, by a server, a playout group including one or more types of components, each component of a type having a different version from another component of the type; configuring, by the server, a playout group information corresponding to the playout group; and transmitting, by the server, to a use device, the playout group information in a media presentation description.

Clause 18. The method of clause 17, wherein the components include visual volumetric video-based coding (V3C) components.

Clause 19. The method of clause 18, wherein the V3C components includes at least one of occupancy components, geometry components, or attribute components.

Clause 20. The method of clause 19, wherein each of the V3C components is represented as a separate adaptation set in the media presentation description.

Clause 21. The method of clause 17, further comprising adding at least one of a playout group identifier corresponding to the playout group or an alternative group identifier to the media presentation description to indicate the playout group information.

Clause 22. The method of clause 21, wherein the playout group identifier corresponds to one or more playout groups associated with V3C components in a presentation set or V3C components in an adaptation set.

Clause 23. The method of clause 21, wherein the alternative group identifier corresponds to one or more alternative groups associated with V3C components in an adaptation set.

Clause 24. The method of clause 17, further comprising configuring a playout group descriptor to include playout group information in the media presentation description.

Clause 25. The method of clause 24, wherein the playout group descriptor corresponds to V3C components in a representation set or an adaptation set associated with one or more playout groups.

Clause 26. The method of any of clauses 24-25, wherein the playout group descriptor includes at least of one or more identifiers (IDs) of playout group, one or more quality levels of playout group, or one or more identifiers (IDs) of V3C component in an adaptation set.

Clause 27. An apparatus for wireless communication, comprising a memory and a processor, wherein the processor reads code from the memory and implements a method recited in any of clauses 1 to 26.

Clause 28. A computer readable program storage medium having code stored thereon, the code, when executed by a processor, causing the processor to implement a method recited in any of clauses 1 to 26.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method of processing media content, comprising:
   determining a playout group corresponding to a volumetric video in a three-dimensional space based on a playout group information, the playout group including a plurality of components, wherein each component of a certain type has a version that is different from another component of the certain type;
   obtaining a two-dimensional volumetric video content from a media track corresponding to the playout group, wherein the plurality of components in the playout group includes components with different versions that correspond to a same atlas or atlas tile and are respectively stored in different media tracks; and
   reconstructing the volumetric video into a three-dimensional space based on the plurality of components with different versions.

2. The method of claim 1, wherein the components include visual volumetric video-based coding (V3C) components, wherein the V3C components includes at least one of occupancy components, geometry components, or attribute components, wherein different versions of the occupancy components, different versions of the geometry components, and different versions of the attribute components, respectively, have dependency between each other.

3. The method of claim 1, wherein the playout group includes V3C components from multiple alternative track groups.

4. The method of claim 1, wherein the different versions include at least one of different encoding methods, different bit rates, or different resolutions.

5. The method of claim 1, wherein the components in the playout group correspond to one or more atlases or atlas tiles, wherein each atlas or atlas tile corresponds to at least one of an attribute component, an occupancy component, or a geometry component with multiple versions.

6. The method of claim 1, wherein the playout group is configured based on: a timed-metadata track for configuring dynamic playout grouping information in a sample entry or in one or more samples belonging to the sample entry or in the sample entry and the one or more samples belonging to the sample entry, or a sample group including samples in a track contained video-encoded component data or a track contained atlas or atlas tile.

7. The method of claim 1, wherein configuration information of the playout group is described by a dynamic playout group configuration box identified by a box type.

8. The method of claim 7, wherein the dynamic playout group configuration box includes at least one of: one or more playout group structures; one or more identifiers of viewport; or one or more quality levels of playout group.

9. A method of processing media content, comprising:
configuring, by a server, a playout group including one or more types of components, wherein the plurality of components in the playout group includes components with different versions that correspond to a same atlas or atlas tile and are respectively stored in different media tracks;
configuring, by the server, a playout group information corresponding to the playout group; and
transmitting, by the server, to a user device, the playout group information in a media presentation description.

10. The method of claim 9, wherein the components include visual volumetric video-based coding (V3C) components, wherein the V3C components includes at least one of occupancy components, geometry components, or attribute components.

11. The method of claim 9, further comprising adding at least one of a playout group identifier corresponding to the playout group or an alternative group identifier to the media presentation description to indicate the playout group information.

12. The method of claim 11, wherein the playout group identifier corresponds to one or more playout groups associated with V3C components in a presentation set or V3C components in an adaptation set.

13. The method of claim 9, further comprising adding at least one of a playout group identifier corresponding to the playout group or an alternative group identifier to an adaptation set or presentation set to indicate the playout group information in dynamic adaptive streaming over hypertext transfer protocol (DASH).

14. The method of claim 9, further comprising configuring a playout group descriptor to include playout group information in the media presentation description.

15. The method of claim 14, wherein the playout group descriptor corresponds to V3C components in a representation set associated with one or more playout groups.

16. The method of claim 14, wherein the playout group descriptor includes at least of one or more identifiers of playout group, one or more quality levels of playout group, or one or more identifiers of V3C component in an adaptation set.

17. An apparatus for wireless communication, comprising a memory and a processor, wherein the processor reads code from the memory and implements a method of processing media content, the method comprising:
determining a playout group corresponding to a volumetric video in a three-dimensional space based on a playout group information, the playout group including a plurality of components, wherein each component of a certain type has a version that is different from another component of the certain type;
obtaining a two-dimensional volumetric video content from a media track corresponding to the playout group, wherein the plurality of components in the playout group includes components with different versions that correspond to a same atlas or atlas tile and are respectively stored in different media tracks; and
reconstructing the volumetric video into a three-dimensional space based on the plurality of components with different versions.

18. The apparatus of claim 17, wherein the components include visual volumetric video-based coding (V3C) components, wherein the V3C components includes at least one of occupancy components, geometry components, or attribute components, wherein different versions of the occupancy components, different versions of the geometry components, and different versions of the attribute components, respectively, have dependency between each other.

19. The apparatus of claim 17, wherein the playout group includes V3C components from multiple alternative track groups.

20. The apparatus of claim 17, wherein the different versions include at least one of different encoding methods, different bit rates, or different resolutions.

* * * * *